United States Patent
Gupta et al.

(10) Patent No.: US 7,489,710 B2
(45) Date of Patent: Feb. 10, 2009

(54) STALL NEED DETECTION AND ASSOCIATED STALL MECHANISM FOR DELAY COMPENSATION IN VIRTUAL CONCATENATION APPLICATIONS

(75) Inventors: Sameer Gupta, Round Rock, TX (US); Michael Samuel Shaffer, Lynnfield, MA (US); Himanshu Mahendra Thaker, Austin, TX (US)

(73) Assignee: Agere Systems Inc., Allentown, PA (US)

( * ) Notice: Subject to any disclaimer, the term of this patent is extended or adjusted under 35 U.S.C. 154(b) by 1025 days.

(21) Appl. No.: 10/420,156

(22) Filed: Apr. 22, 2003

(65) Prior Publication Data

US 2004/0213268 A1 Oct. 28, 2004

(51) Int. Cl.
*H04J 3/06* (2006.01)
(52) U.S. Cl. .......................... 370/516; 370/235; 370/507
(58) Field of Classification Search .............. 370/230.1, 370/235, 401, 412, 395.1, 395.21, 230, 231, 370/503, 507, 508, 509, 516, 517, 519
See application file for complete search history.

(56) References Cited

U.S. PATENT DOCUMENTS

| | | | | | |
|---|---|---|---|---|---|
| 5,293,376 | A | * | 3/1994 | White | 370/258 |
| 5,311,511 | A | * | 5/1994 | Reilly et al. | 370/516 |
| 6,044,079 | A | * | 3/2000 | Calvignac et al. | 370/395.32 |
| 6,496,519 | B1 | * | 12/2002 | Russell et al. | 370/465 |
| 6,594,279 | B1 | * | 7/2003 | Nguyen et al. | 370/468 |
| 6,842,787 | B2 | * | 1/2005 | Stadler et al. | 709/231 |
| 6,985,488 | B2 | * | 1/2006 | Pan et al. | 370/395.3 |
| 7,031,256 | B2 | * | 4/2006 | Hamlin et al. | 370/230 |
| 7,164,688 | B2 | * | 1/2007 | Grimbergen | 370/412 |
| 7,420,922 | B2 | * | 9/2008 | Bruckman et al. | 370/236 |
| 2002/0176450 | A1 | * | 11/2002 | Kong et al. | 370/539 |
| 2003/0161269 | A1 | * | 8/2003 | Brusamolino et al. | 370/235.1 |
| 2004/0076166 | A1 | * | 4/2004 | Patenaude | 370/401 |
| 2004/0179518 | A1 | * | 9/2004 | Bruckman et al. | 370/358 |
| 2004/0228331 | A1 | * | 11/2004 | Hansen et al. | 370/352 |
| 2005/0008042 | A1 | * | 1/2005 | Rouaud | 370/539 |
| 2006/0067235 | A1 | * | 3/2006 | Acharya et al. | 370/238 |
| 2007/0011587 | A1 | * | 1/2007 | Platenberg et al. | 714/774 |

FOREIGN PATENT DOCUMENTS

WO    WO 3063396 A1 * 7/2003

* cited by examiner

*Primary Examiner*—Chi H. Pham
*Assistant Examiner*—Kevin Mew
(74) *Attorney, Agent, or Firm*—Ryan, Mason & Lewis, LLP

(57) ABSTRACT

Virtual concatenation circuitry is disclosed which provides stall need detection and an associated stall mechanism in a network element of a data communication network. The virtual concatenation circuitry in a preferred embodiment is operative to provide differential delay compensation for one or more member streams of a virtual concatenation stream. The differential delay compensation involves introducing delay into at least one of the member streams. The stall need detection aspect of the invention relates to detecting a condition under which introduction of the delay is required for alignment of member streams, for example, upon addition of a member stream to the virtual concatenation stream. Such a condition may arise, for example, if a transmission delay of an added stream is larger than that of all other member streams of the virtual concatenation stream. The stall implementation ensures that, during at least a portion of the introduced delay for a given member stream, data transmitted for that member stream is marked as invalid, thereby preventing the introduction of data errors.

21 Claims, 5 Drawing Sheets

STALL NEED DETECTION AND ASSOCIATED STALL MECHANISM FOR DELAY COMPENSATION IN VIRTUAL CONCATENATION APPLICATIONS

RELATED APPLICATION(S)

The present invention is related to the invention described in U.S. patent application Ser. No. 10/420,153, entitled "Pointer Generation Method and Apparatus for Delay Compensation in Virtual Concatenation Applications," which is filed concurrently herewith and incorporated by reference herein.

FIELD OF THE INVENTION

The present invention relates generally to data communication networks, and more particularly to virtual concatenation techniques for use in such networks.

BACKGROUND OF THE INVENTION

Certain data communication networks, such as those based on the well-known synchronous optical network (SONET) or synchronous digital hierarchy (SDH) standards, can be configured to utilize a technique known as virtual concatenation. The SONET standard is described in Bellcore standards document GR-253 and ANSI standards document T1.105, both of which are incorporated by reference herein. Virtual concatenation in the SONET context is defined in greater detail in the ANSI T1.105-199x standards document, which is part of the above-cited T1.105 document. The SDH standard is described in ITU-T standards document G.707, which is incorporated by reference herein.

Additional details regarding conventional aspects of virtual concatenation can be found in, for example, D. Cavendish et al., "New Transport Services for Next-Generation SONET/SDH Systems," IEEE Communications Magazine, pp. 80-97, May 2002, which is incorporated by reference herein.

In general, virtual concatenation allows a given data communication channel, also referred to as a virtual concatenation (VC) data stream, to be split into several smaller streams, commonly referred to as VC member streams. The set of VC member streams associated with a given VC data stream is also referred to as a virtually concatenated group (VCG) or a VC group. Each of the VC member streams can travel along a different path from a source node to a destination node. As a result, the different member streams typically experience different delays in transit from the source node to the destination node. Upon arrival at the destination node, the individual member streams are recombined into the original VC stream. This splitting and recombining of data traffic is designed to be completely invisible to the transmitting or receiving end users, and allows for a particularly efficient utilization of network bandwidth.

However, this bandwidth efficiency is obtained at the price of increased algorithmic complexity. In particular, the recombining of the individual VC member streams at the destination node requires special care. For example, the destination node must account for the fact that these individual member streams are likely to have encountered different delays along their respective paths. Furthermore, these delays may not be fixed, due to slight variations in the SONET clocks in the various paths. A process known as differential delay compensation is used to realign the individual member streams.

The complexity of the differential delay compensation process is significantly increased if a given VC system is configured to support a protocol known as link capacity adjustment scheme (LCAS). Such a system is referred to herein as a VC/LCAS system. The LCAS protocol allows the system to dynamically add a member stream to, or subtract a member stream from, an existing VC group. This addition or subtraction of a member stream results in a respective increase or decrease in overall data throughput or bandwidth.

The LCAS protocol generally requires that the bandwidth adjustment be configured so as not to introduce errors or otherwise alter the data stream, a requirement also referred to as "hitless" addition and subtraction of bandwidth. Therefore, in a VC/LCAS system, the differential delay compensation process must be capable of accommodating this dynamic change in the individual member delays with respect to the overall group.

Once the destination node has re-aligned the individual member streams utilizing the delay compensation process, it can, for example, process the data and thereby terminate the data path, or re-package the data into an aligned VC/LCAS stream and send it to a downstream network component for further processing. In the latter case, where the data is sent out as VC/LCAS stream, problems can arise in the conventional delay compensation process, particularly with the addition of a new member to an existing group.

It is therefore apparent that a need exists for improved delay compensation in virtual concatenation applications, and more specifically for delay compensation techniques capable of providing efficient support for hitless addition or subtraction of bandwidth in accordance with LCAS or other similar protocol.

SUMMARY OF THE INVENTION

The invention provides improved delay compensation techniques for use in conjunction with virtual concatenation in a data communication network.

In a preferred embodiment, virtual concatenation circuitry in a network element of a data communication network is operative to provide differential delay compensation for one or more member streams of a virtual concatenation stream. The differential delay compensation involves introducing delay into at least one of the member streams, for example, upon addition of a given member stream to the virtual concatenation stream, so as to align the given member stream with one or more other member streams.

A stall need detection aspect of the invention relates to detecting a condition under which introduction of the delay is required to align the given member stream with one or more other member streams of the virtual concatenation stream. For example, such a condition may arise if a transmission delay of the given member stream is larger than that of all other member streams of the virtual concatenation stream. The virtual concatenation circuitry detects the condition based at least in part on a comparison of a write pointer of the given member stream with write pointers of the other member streams and a common read pointer.

In accordance with a stall mechanism aspect of the invention, the virtual concatenation circuitry is configured such that, during at least a portion of the introduced delay for a given member stream, data transmitted for that member stream is marked as invalid, thereby preventing the introduction of data errors. The introduced delay, in conjunction with transmission of data marked as invalid, facilitates alignment of an added member stream with one or more other member streams of the virtual concatenation stream.

Advantageously, the invention can alleviate or eliminate the above-noted delay compensation problems associated with supporting hitless addition and subtraction of bandwidth in a virtual concatenation application, using the LCAS protocol or otherwise, thereby improving the performance of a corresponding network-based communication system.

DETAILED DESCRIPTION OF THE INVENTION

The invention will be illustrated herein in conjunction with a network-based communication system which operates in accordance with the SONET standard. More specifically, the invention will be illustrated in the context of a network element or other processing device configured to repackage a given SONET VC data stream into a delay compensated SONET VC data stream. A delay compensated SONET VC data stream is also referred to herein as an "aligned" stream. It should be understood, however, that the invention is more generally applicable to any virtual concatenation application in which improved performance is desired, including synchronous or plesiochronous applications involving SONET, SDH or other standards, as well as non-standard applications. The present invention is therefore not limited to use with any particular network standard or configuration. The particular network element arrangements shown herein should therefore be understood to represent illustrative examples only.

Figure 1:
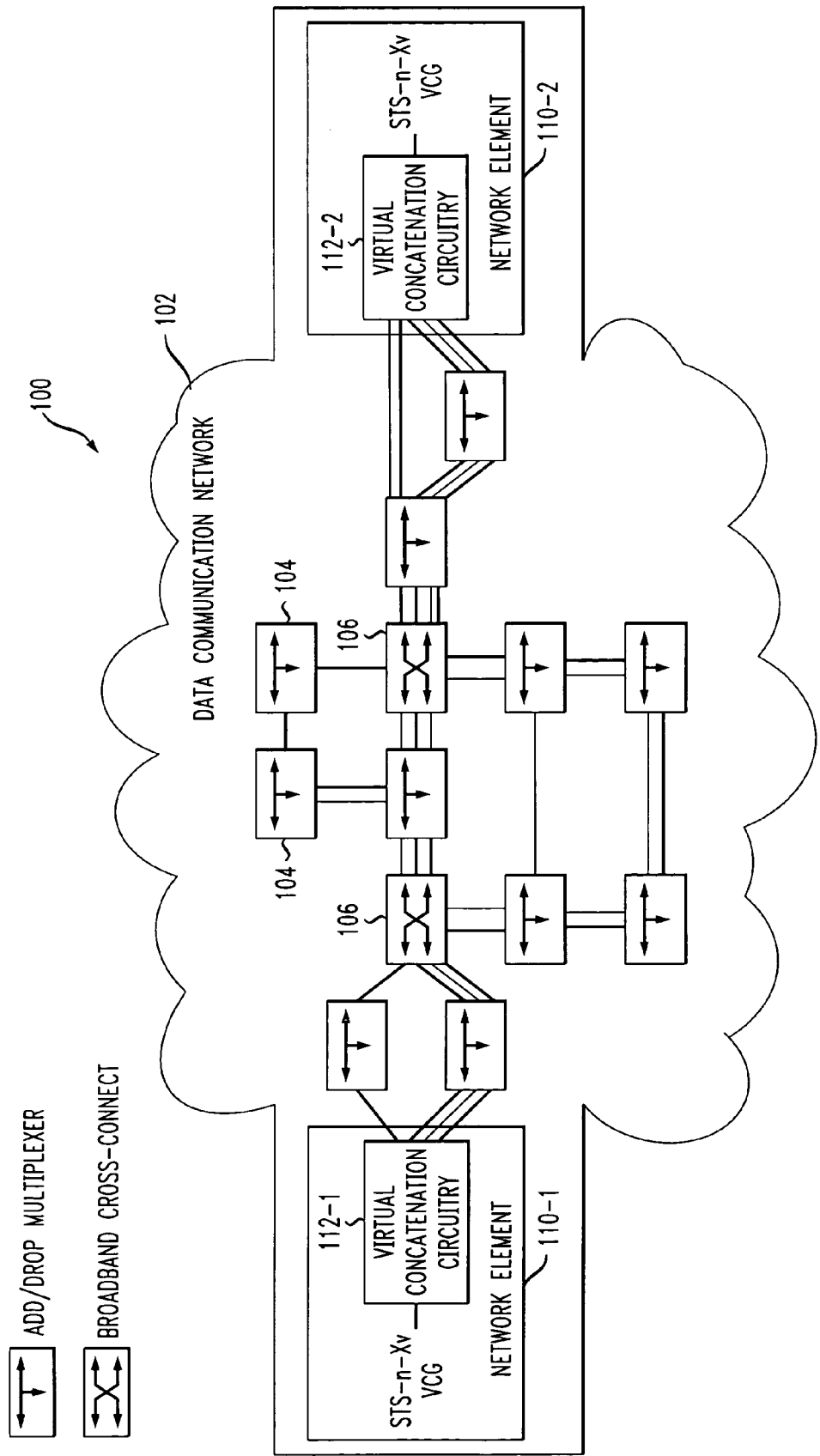
FIG. 1 is a simplified block diagram of an example network-based communication system in which the present invention is implemented.

FIG. 1 shows a network-based communication system 100 which comprises a data communication network 102 configured in accordance with an illustrative embodiment of the invention. The network 102 includes a number of add/drop multiplexers 104 and broadband cross-connects 106, arranged as shown. Also associated with the network 102 are first and second network elements 110-1 and 110-2, respectively. The network elements 110-1 and 110-2 include respective sets of virtual concatenation circuitry 112-1 and 112-2.

In this illustrative embodiment, the virtual concatenation circuitry is configured to process a virtual concatenation stream comprising an STS-n-Xv virtually concatenated group (VCG). The STS-n-Xv stream is a group of X member streams each at an STS-n rate, where STS denotes "synchronous transport signal." The virtual concatenation circuitry may also or alternatively process other types of virtual concatenation streams, and the invention is not limited in this regard.

The network elements 110-1, 110-2 are examples of elements more generally referred to herein as "processing devices." A given processing device generally includes a processor and an associated memory, and may be illustratively implemented as one or more integrated circuits. The processor may comprise, by way of example and without limitation, a microprocessor, a central processing unit (CPU), an application-specific integrated circuit (ASIC), or other type of data processing device, as well as portions and combinations of these and other devices. Similarly, the memory may include electronic memory as well as other types of storage devices, or portions or combinations thereof.

More particularly, a network element of the system 100 may represent a cross-connect or other type of switch, a server, a gateway, a computer, a wireless terminal, a mobile telephone, a personal digital assistant (PDA), a terminal multiplexer, an add/drop multiplexer, or any other type of element connectable to or configurable within the network 102, as well as portions or combinations of such elements.

A given network element may also be referred to herein as a network node, or more particularly as a source node or a destination node.

The virtual concatenation circuitry 112 provides virtual concatenation functionality in the system 100 utilizing the stall need detection and associated stall mechanism of the invention, as will be described in greater detail below in conjunction with FIGS. 2 through 8. This virtual concatenation functionality may be implemented at least in part in the form of one or more software programs which are stored in a memory of an associated network element and executed in a processor of that network element.

The term "virtual concatenation circuitry" as used herein is therefore intended to include any portion of a processor or other type of processing logic circuitry which is capable of performing at least a portion of a virtual concatenation operation in accordance with the techniques of the invention.

It should be understood that the particular arrangement of system elements shown in FIG. 1 is by way of illustrative example only. That is, the system need not include the particular arrangement of elements 104, 106 and 110 shown in the figure. These elements may be replaced with other elements of a type commonly used in otherwise conventional virtual concatenation applications, as will be readily appreciated by those skilled in the art.

In addition, the particular interconnections shown in the figure between network elements 110, add/drop multiplexers 104 and broadband cross-connects 106 illustrate one possible example of the routing of traffic among these elements, but data traffic can be routed through the network 102 in many other ways. Generally, thinner lines between network elements in the figure may correspond to one or more individual member streams of a VC stream that is itself denoted by a thicker line.

As noted above, a significant problem with conventional virtual concatenation techniques is that the differential delay compensation process can experience difficulty when transmitting data as an aligned or delay compensated VC/LCAS stream, particularly in conjunction with the addition of a new member to an existing VC group. The present invention provides improved delay compensation techniques which in an illustrative embodiment overcome this problem.

Figure 2:
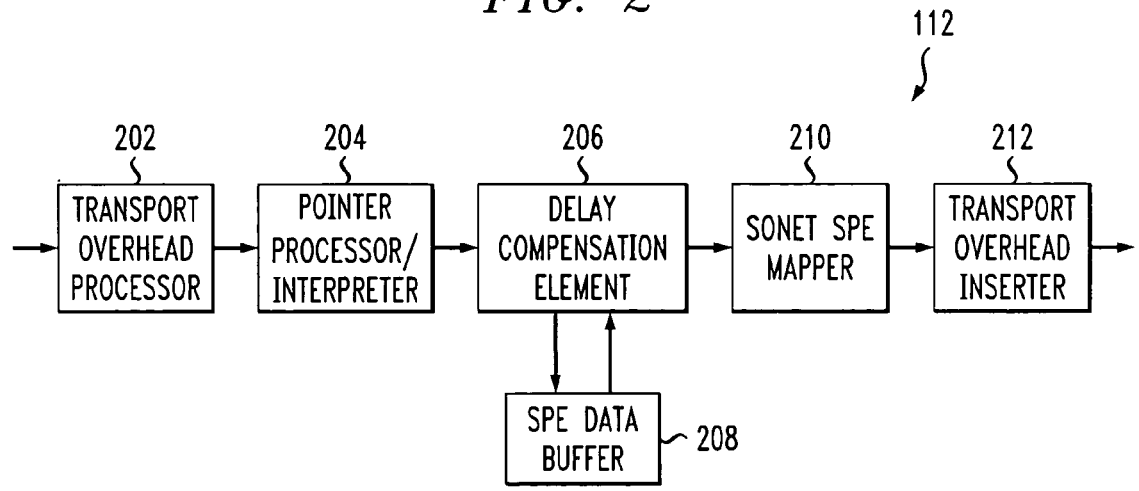
FIG. 2 shows an example of virtual concatenation circuitry in an illustrative embodiment of the invention.

FIG. 2 shows an example of virtual concatenation circuitry 112 in a SONET application which the invention is implemented. The virtual concatenation circuitry 112 includes a transport overhead processor 202, a pointer processor/interpreter 204, a delay compensation element 206, a synchronous payload envelope (SPE) data buffer 208, a SONET SPE mapper 210, and a transport overhead inserter 212. It should be noted that these particular elements are exemplary only, and should not be viewed as requirements of virtual concatenation circuitry in accordance with the invention. Moreover, alternative embodiments of virtual concatenation circuitry used to implement the present invention may include elements not explicitly shown in the figure.

The transport overhead processor 202 terminates section and line overhead bytes and forwards an incoming data stream to the pointer processor/interpreter 204.

The pointer processor/interpreter 204 transfers the data from the incoming clock domain to the system clock domain, and identifies the payload. The latter function generally necessitates pointer interpretation.

The term "pointer" as used herein is intended to include, by way of example and without limitation, information indicating the start of user data within a fixed communication frame structure. More particular examples are described in the above-cited GR-253, T1.105 and G.707 documents.

The SONET SPE mapper 210 is responsible for repackaging the data into a SONET payload.

The transport overhead inserter 212 fills in the section and line overhead bytes appropriately.

The elements 202, 204, 210 and 212 thus operate in a manner substantially similar to corresponding elements of conventional virtual concatenation circuitry. Those skilled in the art are familiar with the operation of such conventional elements, and elements 202, 204, 210 and 212 will therefore not be described in further detail herein.

The present invention in the illustrative embodiment is more particularly implemented in element 206 of the FIG. 2 virtual concatenation circuitry, as will be described in conjunction with FIGS. 3 through 8 below.

Figure 3:
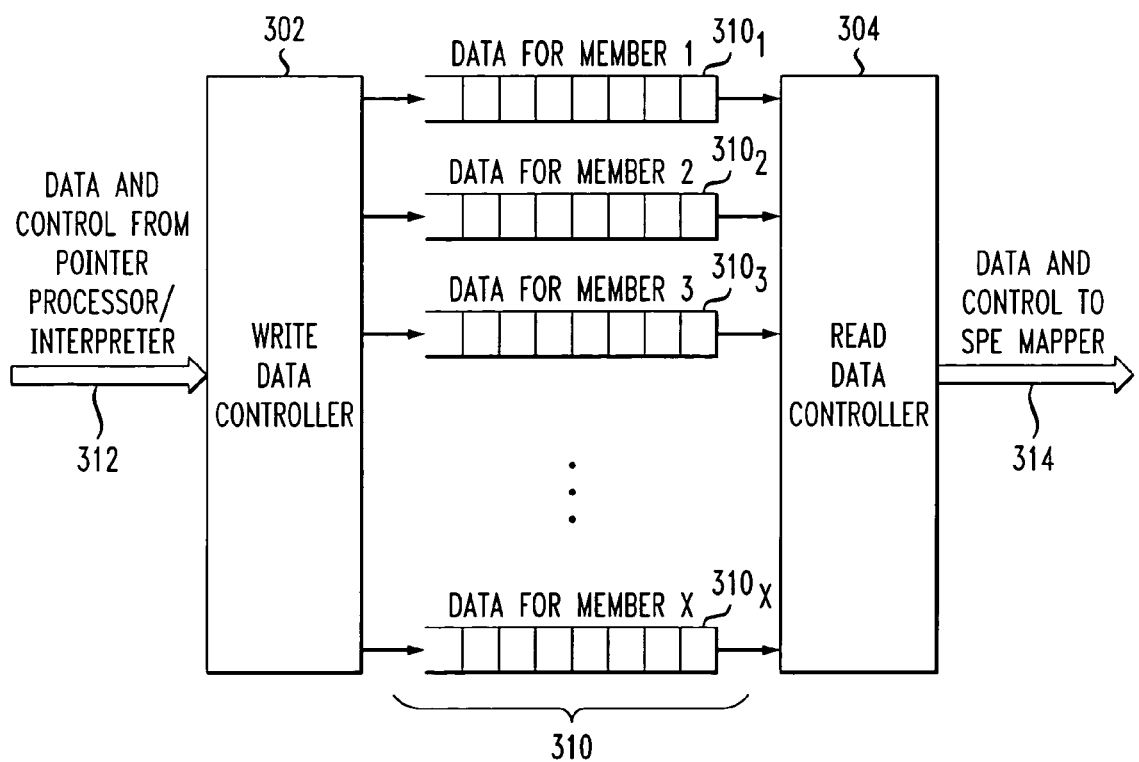
FIG. 3 shows delay compensation and data buffer elements of the FIG. 2 virtual concatenation circuitry.

With reference now to FIG. 3, the delay compensation element 206 and data buffer 208 are shown. The delay compensation element 206 comprises a write data controller 302 and a read data controller 304. The data buffer 208 comprises a set of buffers 310 having a first-in first-out (FIFO) buffer $310_i$ for each of a plurality of member streams 1, 2, ... X. A given one of the FIFO buffers $310_i$ is coupled between a corresponding data output of the write data controller 302 and a corresponding data input of the read data controller 304.

The write data controller 302 receives data and control information from the pointer processor/interpreter 204 via input 312. The read data controller 304 delivers data and control information to the SONET SPE mapper 210 via output 314.

The write data controller 302 is responsible for storing the SPE data from each VC member stream in the corresponding FIFO buffer $310_i$ and performing conventional error checking operations such as H4 byte integrity, missed multi-frame indicator (MFI) frames, etc.

The read data controller 304 reads the SPE data out of the FIFO buffers and sends it to the SONET SPE mapper 210. In addition, the read data controller 304 performs error monitoring operations such as making sure that differential delay is within acceptable limits, etc.

It should be noted that this particular delay compensation element and data buffer configuration is presented by way of example only, and that the present invention does not require the use of the particular arrangement shown.

The differential delay compensation as implemented in delay compensation element 206 generally involves adding varying amounts of individual delay to one or more member streams of a VC group. The amount of delay added to each member stream is such that the sum of the transmission delay and the added delay is substantially identical for all members of the VC group. The delay is typically added to an individual member stream by appropriate queuing of its data in the corresponding FIFO buffer $310_i$ of FIG. 3. More specifically, for each ith and jth member of a VC group, $$Tpd_i + Qd_i = Tpd_j + Qd_j,$$

where $Tpd_i$ and $Tpd_j$ denote the transmission delays experienced by the respective ith and jth members of the VC group, and $Qd_i$ and $Qd_j$ denote the FIFO queuing delays added to the respective ith and jth members of the VC group in the differential delay compensation process.

Conventional SONET virtual concatenation techniques as defined in the above-cited ANSI T1.105-199x document provide a mechanism for time stamping data as it is transmitted at a source node. This timestamp is stored in the H4 field of the path overhead (POH) column and is known as the MFI number. The MFI number is a 12-bit incrementing field that tags each successive SONET frame. A total of 4096 frames can be sent before this MFI number sequence is repeated. Since each SONET frame is 125 microseconds long, the sequence of MFI number repeats every 512 milliseconds. Taking into account aliasing effects, SONET virtual concatenation thus supports up to 256 milliseconds of differential delay compensation capability.

The MFI sequences at different nodes in a SONET network are independent, that is, not linked to common time reference. Therefore, it is generally not possible for the destination node to determine absolute transmission delay Tpd for each member of a VC group. However, by analyzing the MFI number of each member stream, the destination node can determine differential delay between different streams.

In one possible implementation of differential delay compensation, each of the FIFO buffers 310 is configured to include 4096 entries, with each entry having sufficient storage capacity to store one frame of SONET data for the corresponding member stream. The write data controller 302 and read data controller 304 may view this FIFO storage as an array. As previously mentioned, the MFI number ranges from 0 to 4095 before repeating. When a frame is received at the destination node, the MFI number is used as an index into the 4096 entries of the FIFO array to determine the storage location. Therefore, the write operation for each member of a VC group may be totally independent of that for other members of the VC group.

Figure 4:
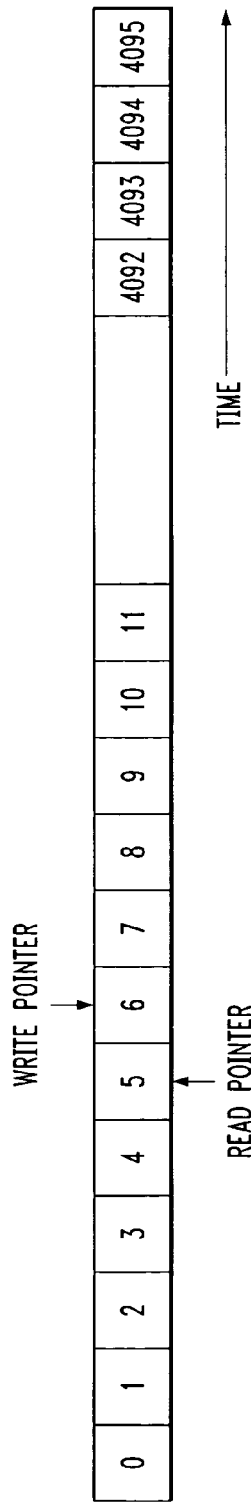
FIGS. 4 through 8 illustrate various aspects of stall need detection and an associated stall mechanism in a delay compensation element of the FIG. 2 virtual concatenation circuitry in accordance with the illustrative embodiment of the invention.

FIG. 4 shows one of the FIFO buffers 310 for a given member stream. Data may be queued in the buffer, with increasing time indicated by the direction of the arrow. It can be seen that the buffer includes 4096 entries, denoted 0 through 4095, and may thus be indexed using the above-described MFI number. In this example, a write pointer maintained by the write data controller 302 points to entry 6 of the buffer, and a read pointer maintained by the read data controller 304 points to entry 5.

For each VC group, the read data controller 304 typically maintains a single read pointer into all the FIFO buffers 310 used for the group. When all members of a VC group have received the data for a particular entry as identified by MFI number, the read data controller sends out the data for the entry pointed to by the read pointer and increments the read pointer, with a wrap-around to zero when the read pointer is at 4095. Recall that data sent concurrently by a source node over different member streams is tagged with the same MFI number. By virtue of the fact that the member stream data containing the same MFI number is sent together by the read data controller, the outgoing stream is now aligned.

Once alignment has been achieved, the different write pointers and the read pointer for a VC group generally remain substantially "locked" with respect to one another over a long period of time, on the order of thousands of frames. Since the source data rate is identical for all the members, the write pointers stay locked by default. The read data controller should ensure that the rate at which the data is sent out is the same as the rate of data being received. This means that the FIFO buffer levels are steady over time once alignment is achieved.

As stated earlier, the LCAS protocol requires that a system be able to add or delete an individual member from a VC group without causing a data error. While deleting a member is usually a straightforward operation, adding a member can be problematic.

An example of the type of problem that can arise when adding a member will now be described in conjunction with FIG. 5.

Assume that at startup a VC group contains a single member, referred to as Member 1. Let D1 denote the transmission delay for this member. Since there is only one member, no added queuing delay is needed for alignment purposes. Now, assume that we need to add to this VC group a new member, referred to as Member 2. Let D2 denote the transmission delay for Member 2. There are three possible relative transmission delay scenarios, namely, D1>D2, D1=D2, and D1<D2. The last scenario (D1<D2) is the one that poses a problem in adding Member 2 to the VC group. This scenario is depicted in FIG. 5, which shows the FIFO buffers for Member 1 and Member 2. As noted previously, associated with the buffers are different write pointers and a single common read pointer.

Figure 5:
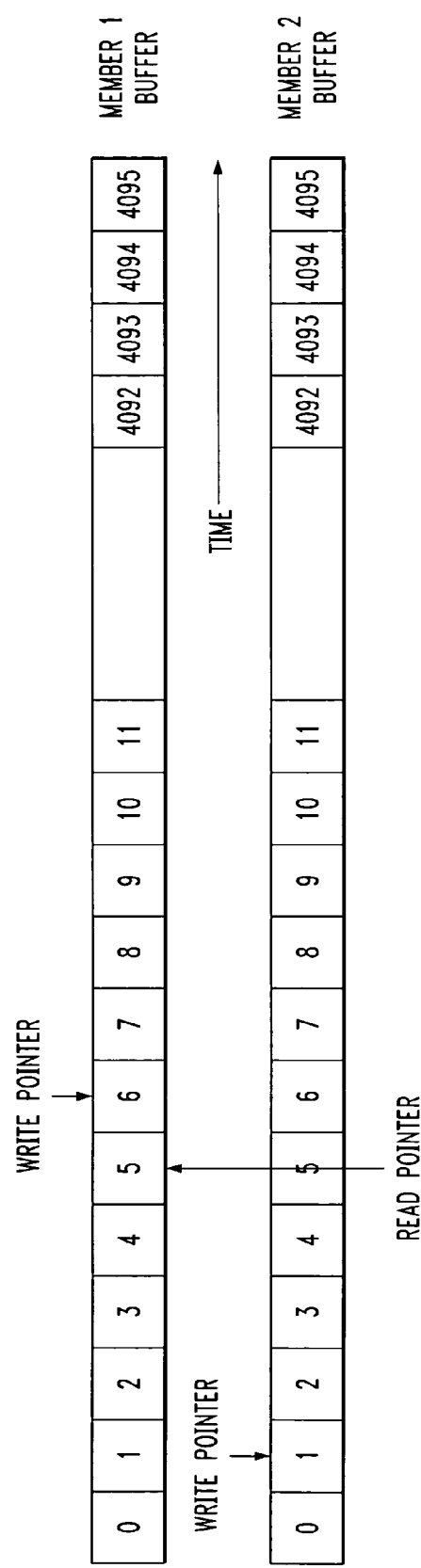

In order to compensate for the differential delay in the D1<D2 example illustrated in FIG. 5, we need to add delay Q1 to Member 1, where the value of Q1 is equal to D2−D1. However, if we simply start queuing the data for Member 1, that is, introduce an instantaneous delay, the current outgoing data stream from the read data controller 304 will be incorrect. Since the read data controller is generating a new SONET stream, it must constantly supply valid SONET frames to prevent the introduction of data errors. The D1<D2 scenario in this example thus appears to present a deadlock, in that even though we must queue the data to introduce delay, the outgoing SONET stream cannot be interrupted.

In accordance with an aspect of the invention, this deadlock is broken through the use of a stall mechanism which in the illustrative embodiment configures the read data controller such that it continues to send valid SONET frames while marking the data invalid. This stall mechanism may utilize the Do Not Use (DNU) field in the LCAS protocol. This field is normally used by the LCAS protocol to identify members of a VC group that include errors, and at any given time may be in one of a number of different logic states, including states denoted DNU and NORMAL.

When in the DNU state, the field indicates errors in the corresponding data, and is referred to herein as a DNU flag. In the absence of errors, the field is in the NORMAL logic state, and is referred to herein as the NORMAL flag. A destination node treats the DNU flag as a data invalid tag and does not pass any of the corresponding data to the user. The stall mechanism in this example thus operates by the read data controller first sending valid SONET frames with the DNU flag for the period of time required to queue sufficient data for Member 1, and then sending the queued data with the NORMAL flag.

In order for this example stall mechanism to operate properly, the read data controller 304 should be configured to address the following issues.

1. Appropriate synchronization between the outgoing MFI sequence, sending out the DNU flag, and the start of data queuing. The DNU flag can be sent out only once every 2 milliseconds. The start of data queuing preferably occurs when the least significant nibble of the MFI number reaches a designated value, such as eight, after sending out the DNU flag, where a "nibble" denotes half of a byte or four bits. Other designated values, such as zero, can be used.

2. Appropriate synchronization between the outgoing MFI sequence, sending out the NORMAL flag, and the start of sending queued data.

3. Normally, there is no need to change the MFI numbers in the read data controller. The incoming MFI sequence is transmitted directly. However, in the present example stall mechanism, while the data from Member 1 is being queued, the read data controller must continue to transmit an incrementing stream of MFI numbers. If no modification of the data MFI numbers is done, the outgoing stream will have a discontinuity in MFI numbers that will cause errors. Therefore, in order to maintain proper operation, the read data controller must keep track of how many SONET frames are sent out while the data is being queued and then add this value to incoming MFI numbers to maintain the continuity of the MFI sequence. It should noted that since this requires modification of the H4 byte, the SONET B3 byte must be recomputed as well.

The foregoing stall mechanism is one example of a technique in accordance with the invention for ensuring transmission of standards-compliant data for a given member stream while introducing a desired amount of delay in that member stream. Numerous alternative techniques may be used for marking transmitted data as invalid when implementing a stall mechanism in accordance with the invention. Moreover, a stall mechanism in accordance with the invention is not limited to stalling any particular single member stream, such as an added member stream. Instead, stall mechanisms may be configured using the teachings described herein to delay multiple member streams other than an added member stream. It should also be noted that in this situation, the same amount of delay need not be provided for each of the multiple streams being delayed using the stall mechanism.

Another aspect of the invention relates to stall need detection, that is, determining the appropriate conditions under which the above-described stall mechanism should be utilized. In the simple example of FIG. 5, the need for a stall was clear. However, a robust stall need detection algorithm provides additional advantages, particularly when a VC group has been established for relatively long period of time and has had bandwidth additions and subtractions.

Figure 6:
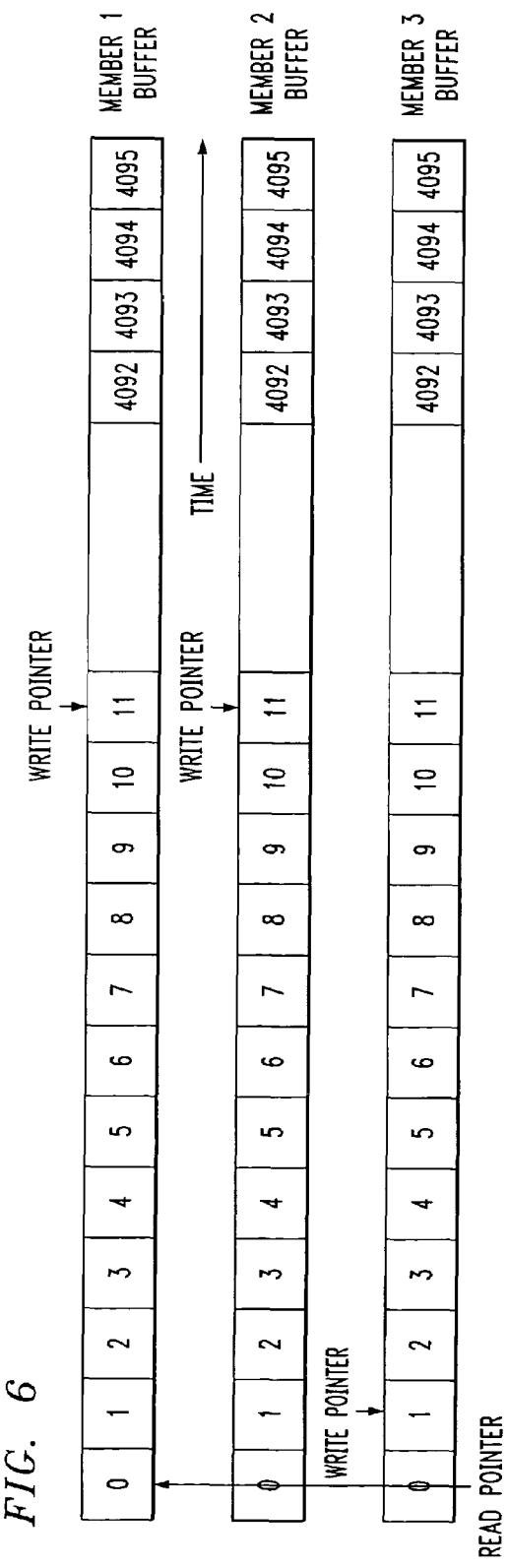
Figure 7:
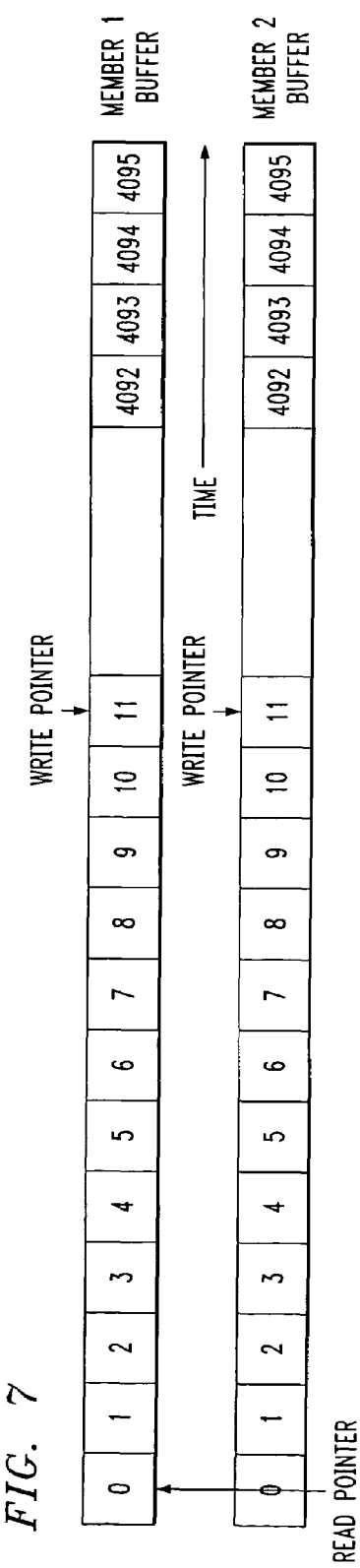
Figure 8:
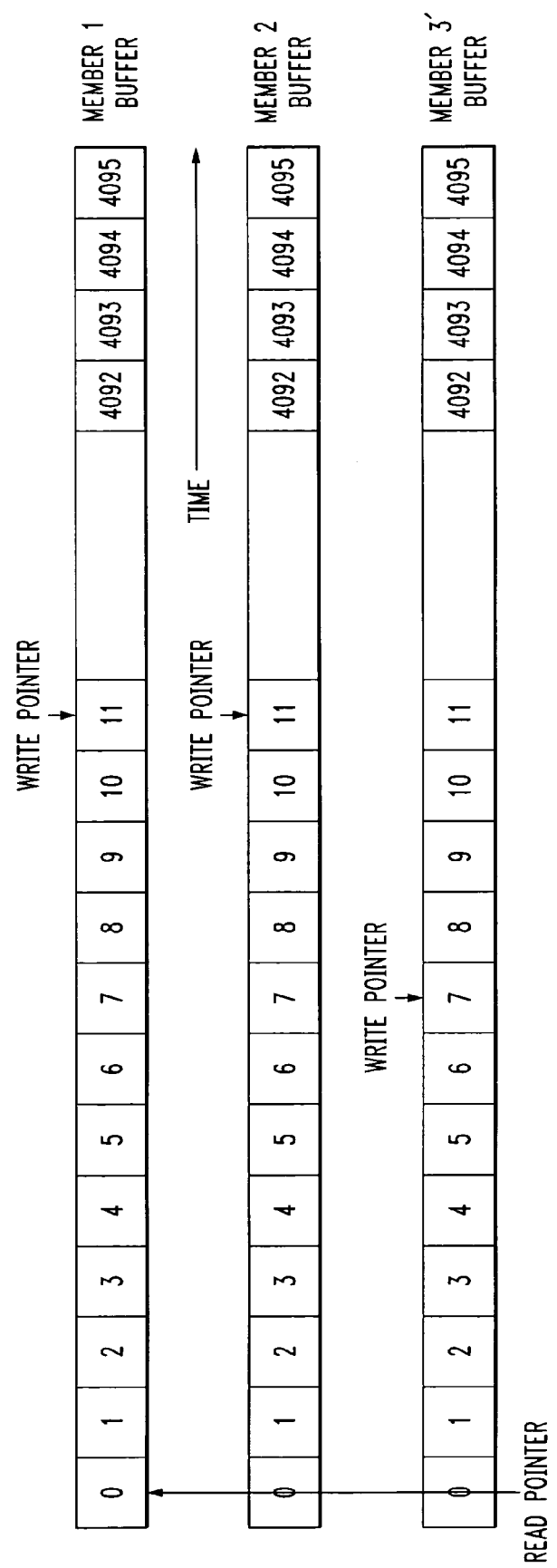

The utility of a stall need detection algorithm will be demonstrated with reference to the following more complex example, to be described in conjunction with FIGS. 6, 7 and 8.

Assume that a VC group initially has three members, denoted Members 1, 2, and 3, with transmission delays of D1, D2, and D3, respectively. Further assume that D1 and D2 are approximately equal and much smaller than D3. In this case, the delay between the read pointer and write pointer for Member 1 will be D3−D1, the delay between the read pointer and write pointer for Member 2 will be D3−D2, and the delay between the read pointer and write pointer for Member 3 will be approximately zero. This initial condition is illustrated in FIG. 6, which shows the FIFO buffers for Members 1, 2 and 3, and the associated read pointer and write pointers.

Now assume that Member 3 is deleted from the VC group. This condition is illustrated in FIG. 7. Immediately after Member 3 is deleted, the delay between the read pointer and the write pointer for Member 1 will remain at D3−D1 and the delay between the read pointer and the write pointer for Member 2 will remain at D3−D2. The fact that D3 is present in the previous two delay values may be surprising in that there is no longer a need to account for the delay of Member 3. However, since the incoming SONET stream and outgoing SONET stream have similar data rates, instantaneous changes in queue delays are impossible. Over time, through pointer adjustments, the delay values will change, but this is a very slow and gradual process.

Now further assume that a new Member 3' is added to the VC group, and that this new Member 3' has a delay D3' that is greater than D1 and D2, but significantly smaller than D3. If we simply compare D1, D2 and D3', according to the simple example of FIG. 5, it would appear that a stall is necessary. However, a stall is in fact not necessary in this case. This is illustrated in FIG. 8, wherein it can be seen that the write pointer for the new Member 3' is already ahead of the read pointer, such that no stall is needed.

The foregoing example illustrates that the need or lack of a need for a stall can be understood by examining the behavior of the write and read pointers. Normally, the read pointer must lag all of the write pointers for the members of the VC group. This lag allows the data for all the members to flow through their respective FIFO buffers and be read together to form an aligned data stream.

In a case where a new member that has a transmission delay larger than all current members is added to a group, a stall will usually be necessary. The stall may be viewed as being operative to "freeze" the read pointer in place until the write pointer of the new member passes the read pointer, at which point the stall may be de-asserted by changing the above-described flag from DNU to NORMAL. However, it is possible that due to the history of the group, there is enough difference between the read pointer and the write pointers to accommodate the new member without the need for a stall.

Therefore, while differential delay compensation is generally defined in terms of difference in transmission delay among the different VC group members, it is preferable to base the actual actions upon comparison of the write pointer of the new member with the existing write pointers and the read pointer for the VC group. The three possible scenarios and the required actions in an example stall need detection algorithm of the present invention are as follows:

1. The transmission delay of the new member is smaller than that of all other members. In this case, no stall is needed. However, the determination of whether or not sufficient queue memory is available for differential delay compensation should nonetheless be based upon a comparison of the write pointer of the new member with the read pointer for the VC group. A determination based upon comparison of write pointers only may cause errors in certain cases.

2. The transmission delay of the new member is between that of the other members. In this case, no stall or other special operation is needed.

3. The transmission delay of the new member is larger than that of all other members. In this case, the determination as to whether a stall is needed should be based upon a comparison of the write pointer of the new member with the read pointer for the VC group. Further, to determine whether there is sufficient memory available for differential delay compensation, the write pointer of the new member should be compared with the write pointers of the other members.

It is to be appreciated that this particular stall need detection algorithm is presented by way of illustrative example only, and other stall need detection techniques may be used in implementing the invention. Moreover, a stall mechanism in accordance with the invention can be implemented without the use of a stall need detection algorithm. Similarly, a given stall need detection algorithm in accordance with the invention can be implemented using other types of stall mechanisms.

An advantage of the stall need detection and stall implementation techniques described above is that such techniques can allow hitless addition and subtraction of bandwidth in a VC/LCAS node or system, without the problems associated with conventional techniques.

The write data controller 302 and read data controller 304 may be implemented as otherwise conventional controllers modified in a straightforward manner to include appropriate logic for implementing the above-described stall need detection and associated stall mechanism. Numerous suitable arrangements of such processing logic will be readily apparent to those skilled in the art. Other elements of the virtual concatenation circuitry 112 can be modified in a similar manner.

The stall need detection and stall implementation techniques described herein can be implemented at least in part in the form of one or more software programs. As mentioned above, such programs may be stored in a memory of a network element 110 and executed by a processor of that element.

The stall need detection and stall implementation techniques described herein can also or alternatively be implemented at least in part in the form of one or more integrated circuits, for example, an integrated circuit having a processor and a memory, and associated with a network element 110.

Although particularly well-suited for use in a network element or other processing device configured to repackage a given VC data stream into a delay compensated VC data stream, the invention can be implemented in a variety of other types of processing devices.

As indicated previously, the above-described embodiment of the invention is intended to be illustrative only. For example, although the illustrative embodiment implements the invention at least in part in read and write data controllers of a delay compensation element, the invention can be implemented using other arrangements of hardware and software. In addition, alternative stall need detection algorithms or stall mechanisms may utilize different pointer arrangements and different types of processing logic. Furthermore, other techniques may be used for introducing delay in one or more member streams while transmitting standards-compliant data for those streams. These and numerous other alternative embodiments within the scope of the following claims will be apparent to those skilled in the art.

What is claimed is:

1. An apparatus for use in implementing virtual concatenation operations in a data communication network, the apparatus comprising:
   a network element comprising virtual concatenation circuitry;
   the virtual concatenation circuitry being operative to provide differential delay compensation for one or more member streams of a virtual concatenation stream, the differential delay compensation introducing delay into at least one of the member streams to at least partially compensate for different delays experienced by respective ones of the member streams in traversing respective paths between a source node and a destination node of the network, wherein during at least a portion of the introduced delay for a given member stream data transmitted for that member stream is marked as invalid.

2. The apparatus of claim 1 wherein the delay is introduced into transmitted data associated with one or more outgoing member streams of the virtual concatenation stream at the network element.

3. The apparatus of claim 1 wherein the network element is configured to support a link capacity adjustment scheme (LCAS) protocol.

4. The apparatus of claim 1 wherein the virtual concatenation stream comprises a virtually concatenated group having one or more synchronous transport signal member streams.

5. The apparatus of claim 1 wherein the introduced delay comprises an amount of delay sufficient to ensure that a read pointer associated with a plurality of member streams of the virtual concatenation stream lags write pointers of the member streams.

6. The apparatus of claim 1 wherein the introduced delay is introduced responsive to addition or deletion of a member stream from the virtual concatenation stream.

7. The apparatus of claim 1 wherein the introduced delay is introduced by queuing data of a plurality of existing member streams of the virtual concatenation stream in corresponding data buffers of the virtual concatenation circuitry.

8. The apparatus of claim 7 wherein after a sufficient amount of the data has been queued in one or more of the buffers to achieve introduction of a desired amount of delay, the data queued in one or more of the buffers is transmitted marked as valid.

9. The apparatus of claim 1 wherein the introduced delay and transmission of data marked as invalid are operative to stall at least one of the member streams by substantially an amount of time required to align all of the member streams of the virtual concatenation stream.

10. The apparatus of claim 1 wherein the data transmitted for the given member stream is marked as invalid utilizing a field associated therewith, the field having at least a first state indicating valid data and a second state indicating invalid data.

11. The apparatus of claim 10 wherein the field comprises a Do Not Use (DNU) field defined in accordance with a link capacity adjustment scheme (LCAS) protocol.

12. The apparatus of claim 1 wherein the virtual concatenation circuitry is further operative to maintain proper increments in multi-frame indicator (MFI) number for the given member stream for a period of time which includes a period for which the data is transmitted marked as invalid.

13. The apparatus of claim 1 wherein the virtual concatenation circuitry is further operative upon addition of the given member stream to the virtual concatenation stream to detect a condition under which introduction of the delay is required to align the given member stream with one or more other member streams of the virtual concatenation stream.

14. The apparatus of claim 13 wherein the virtual concatenation circuitry detects the condition based at least in part on a comparison of a write pointer of the given member stream with write pointers of the one or more other member streams and a read pointer associated with the one or more other member streams.

15. The apparatus of claim 13 wherein detection of the condition further includes detection of a condition that a transmission delay of the given member stream is larger than that of all other member streams of the virtual concatenation stream.

16. The apparatus of claim 1 wherein the virtual concatenation circuitry further comprises:

a data buffer; and
a delay compensation element coupled to the data buffer, the delay compensation element comprising a write data controller and a read data controller;
wherein the data buffer comprises a set of buffers having a buffer for each of the member streams, a given one of the data buffers being coupled between a corresponding data output of the write data controller and a corresponding data input of the read data controller.

17. The apparatus of claim 16 wherein the write data controller maintains a write pointer for each of the member streams of the virtual concatenation stream, and the read data controller maintains a single common read pointer for all of the member streams of the virtual concatenation stream.

18. The apparatus of claim 1 wherein the virtual concatenation circuitry comprises a plurality of data buffers, each data buffer corresponding to one of the member streams of the virtual concatenation stream, at least one of the data buffers comprising a number of entries defined by a maximum sequence numbering interval of the corresponding member stream.

19. The apparatus of claim 18 wherein the data buffer comprises 4096 entries each having a capacity for storing a frame of data for the corresponding member stream.

20. A method for use in implementing virtual concatenation operations in a network element of a data communication network, the method comprising:
providing differential delay compensation for one or more member streams of a virtual concatenation stream, the differential delay compensation introducing delay into at least one of the member streams to at least partially compensate for different delays experienced by respective ones of the member streams in traversing respective paths between a source node and a destination node of the network;
wherein during at least a portion of the introduced delay for a given member stream data transmitted for that member stream is marked as invalid.

21. An integrated circuit configured for implementing virtual concatenation operations in a data communication network, the integrated circuit comprising:
virtual concatenation circuitry comprising a data buffer and a delay compensation element coupled to the data buffer;
the virtual concatenation circuitry being operative to provide differential delay compensation for one or more member streams of a virtual concatenation stream, the differential delay compensation introducing delay into at least one of the member streams to at least partially compensate for different delays experienced by respective ones of the member streams in traversing respective paths between a source node and a destination node of the network, wherein during at least a portion of the introduced delay for a given member stream data transmitted for that member stream is marked as invalid.

* * * * *